(12) United States Patent
Udaka et al.

(10) Patent No.: US 7,072,091 B2
(45) Date of Patent: Jul. 4, 2006

(54) DISPLAY ELEMENT AND PRODUCTION THEREOF

(75) Inventors: Toru Udaka, Kanagawa (JP); Tatsuhiko Matsumoto, Tokyo (JP); Kazuhiro Noda, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/482,265

(22) PCT Filed: Jun. 7, 2002

(86) PCT No.: PCT/JP02/05699

§ 371 (c)(1),
(2), (4) Date: Jun. 1, 2004

(87) PCT Pub. No.: WO03/001289

PCT Pub. Date: Jan. 3, 2003

(65) Prior Publication Data

US 2004/0207899 A1    Oct. 21, 2004

(30) Foreign Application Priority Data

Jun. 26, 2001  (JP) .............................. 2001-192204

(51) Int. Cl.
*G02F 1/15* (2006.01)

(52) U.S. Cl. ..................................................... 359/265

(58) Field of Classification Search ......... 359/265–275
See application file for complete search history.

(56) References Cited

U.S. PATENT DOCUMENTS 5,825,526 A * 10/1998 Bommarito et al. ........ 359/265
6,111,685 A * 8/2000 Tench et al. ................ 359/267
6,862,125 B1 * 3/2005 Warner et al. .............. 359/265

FOREIGN PATENT DOCUMENTS

| EP | 0 545 041 | 6/1993 |
| EP | 0545041 | 6/1993 |
| EP | 0495220 | 7/2001 |
| EP | 1154311 | 11/2001 |
| JP | 58-207027 | 12/1983 |
| JP | 07-5497 | 1/1995 |
| WO | WO 92/09004 | 5/1992 |
| WO | WO 00/49454 | 8/2000 |

* cited by examiner

*Primary Examiner*—Hung Xuan Dang
*Assistant Examiner*—Tuyen Tra (74) *Attorney, Agent, or Firm*—Sonnenschein Nath & Rosenthal LLP (57) ABSTRACT

A high-quality-easy-to-fabricate display element and a process for production thereof. The display element (18) has between transparent pixel electrodes (2) and a common electrode (6) a polymeric electrolyte (5) which contains a coloring substance (metal ions) such as AgI which separates out, dissolves, or changes in color upon electrochemical reduction or oxidation. The process includes placing a monomer or an uncrosslinked polymer of a solution (5A) as a starting material for the polymeric electrolyte layer (5), together with the coloring substance (metal ions) and a supporting electrolyte, between the transparent pixel electrodes (2) and the common electrode (6) and polymerizing or crosslinking the starting material by thermal polymerization or the like, thereby forming the polymeric electrolyte layer (5).

16 Claims, 7 Drawing Sheets

DISPLAY ELEMENT AND PRODUCTION THEREOF

BACKGROUND OF THE INVENTION

The present invention relates to a display element and a process for production thereof, said display element relying for its action on a material which separates out, dissolves, or changes in color upon electrochemical reduction or oxidation.

The recent widespread use of networks is replacing the conventional way of distributing printed matter by the transmission of so-called electronic documents. More books and magazines than before are being offered by so-called electronic publication.

Reading information in these forms usually needs a computer's cathode ray tube (CRT) or liquid-crystal display. Unfortunately, such displays of light-emitting type are ergonomically incomplete to permit continuous reading for many hours. Moreover, they can be used only in the vicinity of a computer.

Recently diffused notebook computers can be used as portable displays for reading; however, they are also unsuitable for reading for several hours or more because they still have the disadvantage inherent in those of light-emitting type and they consume a large amount of electric power.

A recent technical innovation in this field is the development of a liquid-crystal display of reflective type which operates with a less amount of electric power than before. However, it is poor in reflectivity—only 30% in the state of white-color display (with nothing appearing on the screen). Therefore, it is by far inferior in legibility to printed paper, which constantly fatigues readers.

One way to address the above-mentioned problems is by development of so-called paper-like display or electronic paper. It is based on the principle that a color is produced when chromatic particles are moved from one electrode to the other by electrophoresis or when dichroic particles are rotated in an electric field. The disadvantage of color development in this manner is that the space surrounding particles absorbs light, thereby reducing contrast. Another disadvantage is that a driving voltage higher than 100 V is necessary to achieve a practical writing speed (less than 1 second).

The low-contrast color development based on electrophoresis is overcome by the electrochromic display (ECD) which employs electrochemical reactions to produce colors. It is now in practical use as light-modulating glass and clock display, which do not need matrix driving. However, it is not suitable for displays, such as electronic paper, which need repeated on and off. Moreover, it is usually poor in black color quality, less flexible, and low in reflectivity.

The electrochromic display device, such as light-modulating glass and clock display, employs an organic material to form black segments. (In other words, electrochromism with an organic material is essential for good black color development.)

Unfortunately, special displays such as electronic paper are continuously exposed to sun light and room light by their nature, and organic materials are usually poor in light resistance and decrease in black density due to discoloration after use for a long time.

Also, as the liquid crystal unit, the one which uses the matrix drive unit as disclosed in, for example, Japanese Patent Publication No. Hei 4-73764 is known; however, the drive element used therein merely constitutes a part of the liquid crystal display unit.

Therefore, it has been required to find the mechanism suitable for the display medium such as electronic paper and paper-like display.

Unfortunately, in the display system that uses an electrochromic display unit, the one which satisfies the constitution suitable for the display medium such as the above-mentioned electronic paper and paper-like display does not exists.

With foregoing in mind, the present inventors paid their attention to a new display device in which color development takes place as metal ions (electrolyte) separate out and dissolve.

It was pioneered by the one proposed by Camlibel et al. which resorts to silver ions. (U.S. Pat. No. 4,240,717)

This precursory device, however, has never been put to practical use because of problems with reliability and repeatability.

In addition, it has problems with liquid leakage and thickness variation because it employs a solution of metal ions. Therefore, it presents difficulties in production and use as electronic paper or paper-lie display.

The present invention was completed in view of the foregoing. It is an object of the present invention to provide a high-quality display element which is easy to fabricate and to provide a process for production thereof.

SUMMARY OF THE INVENTION

The present invention is directed to a display element which includes a coloring substance, which separates out, dissolves, or changes in color upon electrochemical reduction or oxidation, and a polymeric electrolyte, which are both held between a first electrode and a second electrode, the polymeric electrolyte being formed from a monomer or an uncrosslinked polymer as a starting material by polymerization or crosslinking between the first and second electrodes. The uncrosslinked polymer includes linear polymers, low-molecular-weight linear polymers having a weight-average molecular weight of 400,000, and oligomers.

The present invention is directed also to a process for producing a display element having a coloring substance, which separates out, dissolves, or changes in color upon electrochemical reduction or oxidation, and a polymeric electrolyte, which are both held between a first electrode and a second electrode, the process including placing a monomer or an uncrosslinked polymer (as a starting material) together with said coloring substance between said first and second electrodes and polymerizing or crosslinking the starting material, thereby forming the polymeric electrolyte.

According to the present invention, the display element has a polymeric electrolyte layer which is formed by placing a monomer or an uncrosslinked polymer (as a starting material) together with a coloring substance between a first electrode and a second electrode and subsequently polymerizing or crosslinking the starting material. Having a low viscosity before polymerization or crosslinking, the starting material gives a thin flexible polymeric electrolyte film in any form readily and invariably.

In addition, the low-viscosity starting material permits uniform dispersion of various substances to be mixed. Therefore, it gives a uniformly thick film of uniformly crosslinked polymer (or a polymeric electrolyte with three-dimensional crosslink structure).

The polymeric electrolyte helps the coloring substance to assume or lose a color selectively upon electrochemical reduction or oxidation between the first and second electrodes. In addition, it transports ions to accomplish color development and color bleaching rapidly. The color produced in this manner has a high contrast and a high color density (e.g., black density), and it is durable for a long period of time.

Incidentally, it is conceivable that the device capable of producing a color by deposition and dissolution of metal ions (electrolyte) for color development may be obtained by forming a polymeric electrolyte layer by application (followed by drying) of a previously polymerized and crosslinked polymer onto an electrode. The disadvantage in this case is that the previously polymerized and crosslinked polymer cannot be readily formed into a desired shape and hence it is difficult to obtain a thin polymeric electrolyte layer. Moreover, such a polymer tends to coagulate., thereby giving a non-homogeneous polymeric electrolyte, and is subject to settling, variation in concentration, and degradation.

DETAILED DESCRIPTION OF THE PRESENTLY PREFERRED EMBODIMENTS

According to the present invention, it is desirable to form the polymeric electrolyte from a mixture of the above-mentioned polymeric electrolyte and the above-mentioned coloring substance, so that the resulting polymeric electrolyte performs electrolytic function (for ion transmission) and coloring function (electron supply which takes place when ions are reduced)

The above-mentioned coloring substance should preferably be an electrolyte containing at least one kind of ion capable of electrolytic deposition selected from the group consisting of bismuth, copper, silver, lithium, iron, chromium, nickel, and cadmium, so that the coloring substance readily undergoes reversible reactions for color development and color bleaching and takes on a deep color when ions becomes reduced to separate out.

The polymerization or crosslinking of the starting material should preferably be carried out by any of thermal polymerization, photopolymerization, and radiation polymerization.

The thermal polymerization may be promoted with the aid of a polymerization initiator such as peroxide and azobis compound.

The photopolymerization may be promoted with the aid of at least one polymerization initiator selected from the group consisting of benzoin-, anthraquinone-, and phenylacetophenone-derivatives, benzophenone, and thiophenol.

The starting material which becomes the polymeric electrolyte later should preferably be at least one member selected from the group consisting of polymeric material (defined below), polyacrylate, polymethyl methacrylate, polyvinylidene fluoride, polycarbonate, polyacrylonitrile, polyvinyl alcohol, and a mixture thereof. The polymeric material includes polyalkylene oxide (such as polyethylene oxide), polyalkylene imine (such as polyethylene imine), and polyalkylene sulfide (such as polyethylene sulfide), which have the skeleton unit represented by $-[(CH_2)_mO]_n-$, $-[(CH_2)_mN]_n-$, and $-[(CH_2)_mS]_n-$, respectively, and branches extending from the main chain. They may be in the form of liquid or powder, with preferred values of m and n being 1 to 5.

The above-mentioned polymeric electrolyte should preferably be incorporated with a plasticizer to improve its processability. Preferred plasticizers for hydrophilic polymers are water, ethyl alcohol, isopropyl alcohol, and a mixture thereof. Preferred plasticizers for hydrophobic polymers are ethylene carbonate, propylene carbonate, butylene carbonate, dimethyl carbonate, diethyl carbonate, ethyl methyl carbonate, γ-butyrolactone, acetonitrile, propionitrile, sulfolane, dimethoxyethane, diethoxyethane, tetrahydrofuran, methyl acetate, ethyl acetate, ethyl propionate, formamide, dimethylformamide, diethylformamide, dimethylsulfoxide, dimethylacetamide, n-methylpyrrolidone, and a mixture thereof (particularly aprotic solvents).

The above-mentioned polymeric electrolyte should preferably be incorporated with at least one whitening auxiliary material selected from the group including white particles, white cloth, and white paper, so that it increases in display contrast. Examples of coloring white particles include titanium dioxide, calcium carbonate, silicon dioxide (silica), magnesium oxide, and aluminum oxide. It is also possible to use dyestuff for coloring.

A preferred embodiment of the present invention will be described in more detail with reference to the accompanying drawings.

Figure 3:
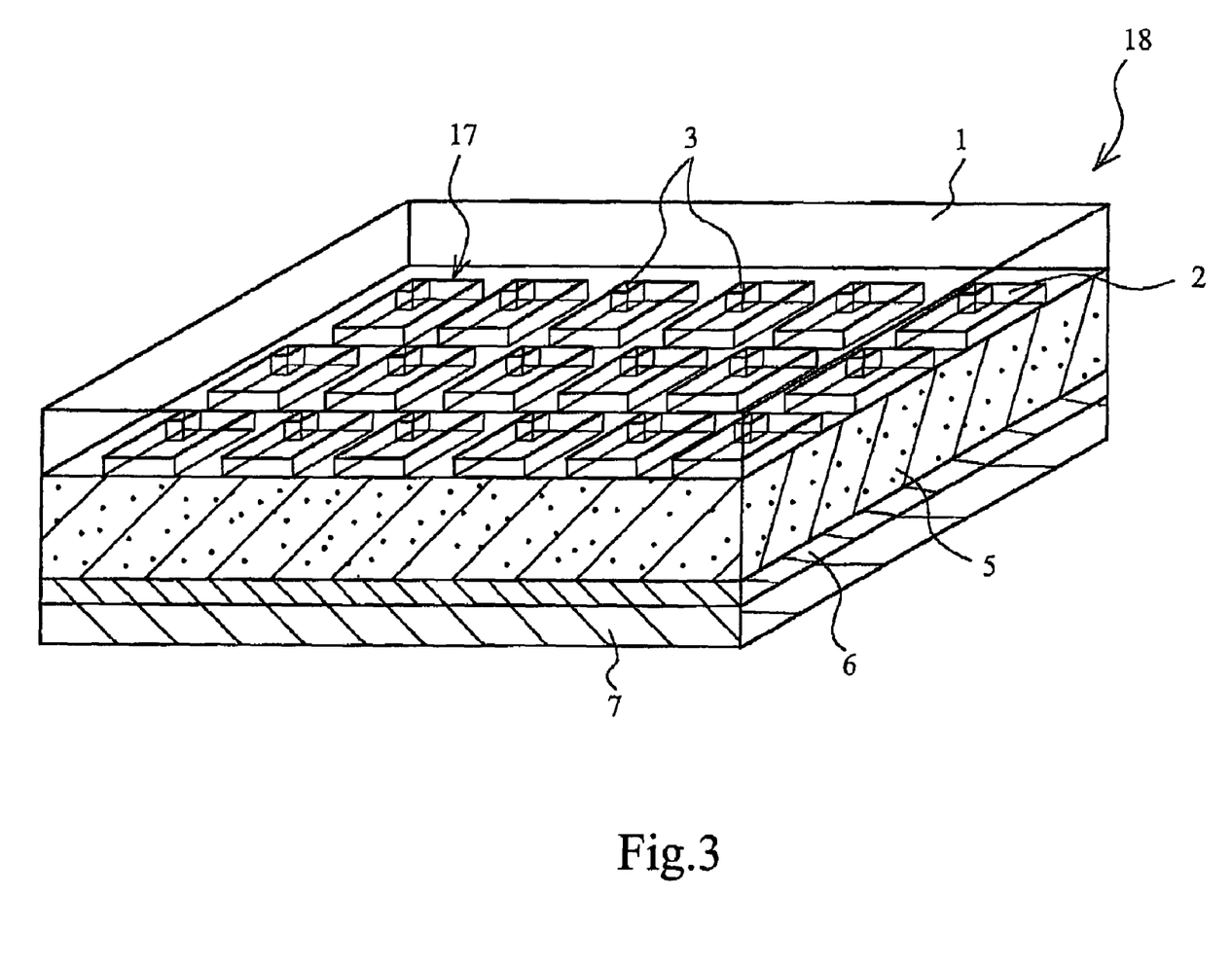
FIG. 3 is a partly sectional perspective view of the display element mentioned above.
Figure 4:
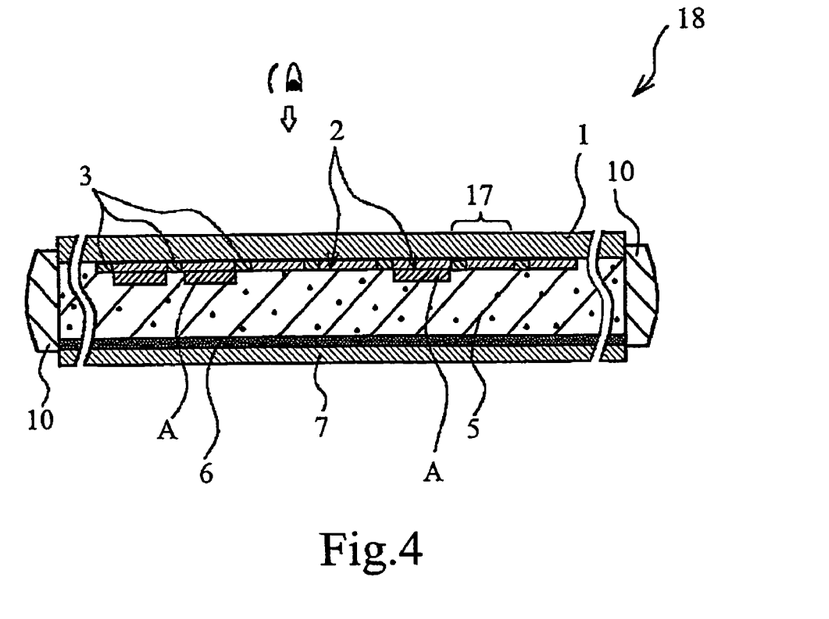
FIG. 4 is a sectional view of the display element mentioned above.

FIGS. 3 and 4 show a display element 18 of flat panel type which is composed of a plurality of pixels 17, each including a transparent pixel electrode 2 (first electrode), a common electrode 6 (second electrode) and a polymeric electrolyte layer 5. The transparent pixel electrode 2 is controled by a TFT (Thin Film Transistor) 3 as a drive device. The common electrode 6 (second electrode) is disposed opposite to the first electrode. The polymeric electrolyte layer 5, which is placed between the two electrodes, contains metal ions (an electrolyte as a coloring substance), a polymeric electrolyte, and a whitening agent.

The display element 18 is composed of pixels, each having the transparent pixel electrode 2 and the thin film transistor (TFT) 3. A plurality of such pixels are regularly arranged (in a dot or matrix pattern) on the transparent support 1.

The transparent support 1 may be a transparent quartz glass sheet or colorless glass sheet. It may also be formed from polyesters (such as polyethylene naphthalate and polyethylene terephthalate), polyamides, polycarbonates, cellulose esters (such as cellulose acetate), fluoropolymers (such as polyvinylidene fluoride, polytetrafluoroethylene, and polyhexafluoropropylene), polyethers (such as polyoxymethylene), polyacetals, polyolefins (such as polystyrene, polyethylene, polypropylene, and polymethylpentene), and polyimides (such as polyimideamide and polyether imide).

The transparent support 1 of plastics may be formed rigid or flexible.

The transparent pixel electrode 2 is formed from transparent conductive film patterned in rectangle or square. As FIG. 3 shows, pixels 17 are separated from each other, and each pixel 17 has a TFT 3 formed on a part thereof.

The transparent pixel electrode 2 should preferably be thin film formed by sputtering or vacuum deposition from ITO (a mixture of $In_2O_3$ and $SnO_2$), $SnO_2$, $In_2O_3$, MgO, or ZnO. The thin film may be doped with Sn or Sb.

The TFT 3 formed on each pixel 17 drives the corresponding transparent pixel electrode 2 as it is selected by wiring (not shown). Incidentally, the TFT 3 is effective in preventing cross-talk between pixels 17. In addition, the TFT 3 is usually formed on one corner of the transparent pixel electrode 2; however, it may overlap with the transparent pixel electrode 2.

Figure 5:
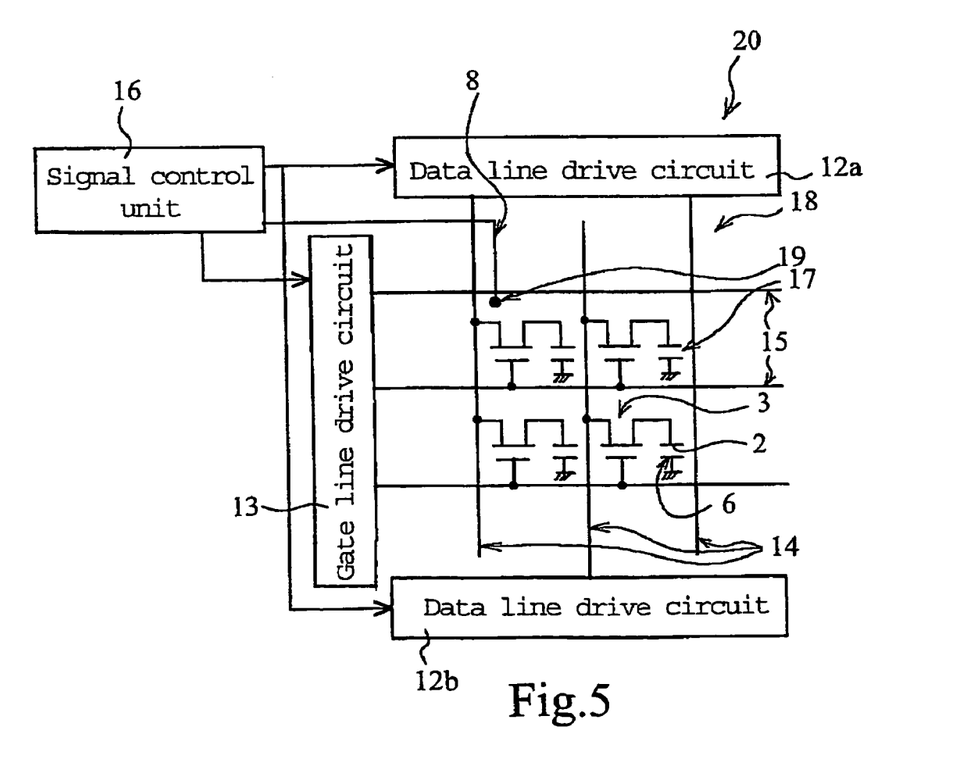
FIG. 5 is an equivalent circuit diagram of the display element in one embodiment of the present invention.

To be more specific, the TFT 3 has gate lines 15 and data lines 14 connected thereto, as shown in FIG. 5. Each gate line 15 is connected to the gate electrode of each TFT 3, and each data line 14 is connected to the source (or drain) of each TFT 3. The drain (or source) is electrically connected to the transparent pixel electrode 2.

The display element according to this embodiment has the polymeric electrolyte layer 5 which contains metal ions (electrolyte) as a coloring substance. The metal ions (electrolyte) used for color development may be one which is derived from metal halide such as silver halide. Such metal ions perform color development and color bleaching reversibly. Color development is induced by electrochemical deposition (or electroplating), and color bleaching is induced by the reverse reaction. In this way, display is carried out. The pattern A of color development is formed by deposited silver, and it is viewed through the transparent support 1. (See FIG. 4.)

The metal ions (electrolyte) capable of color development and color bleaching by electrochemical deposition and dissolution may be obtained from any of bismuth, copper, silver, lithium, iron, chromium, nickel, and cadmium in the form of ions. Bismuth ions and silver ions are particularly preferable because they readily undergo reversible reactions (for repeated color development and color bleaching) and they change in color deeply upon deposition.

The polymeric electrolyte layer 5 will be described in more detail later.

The common electrode 6 (as a second electrode) is formed opposite the transparent pixel electrode 2. This common electrode 6 may be formed from any electrochemically stable metal, such as platinum, chromium, aluminum, cobalt, and palladium. It may be formed on the support 7 by sputtering or vacuum deposition.

The common electrode 6 may also be formed from carbon if it is possible to previously or occasionally supply sufficient metal for the main reaction. In this case, carbon may be supported on a metal electrode by printing the support with a resin-based carbon paint. Carbon used in this manner will save the cost of the common electrode 6.

The material for the support 7 does not always need to be transparent; it may be a sheet or film capable of supporting the common electrode 6 and the polymeric electrolyte layer 5.

Examples of the support 7 include glass supports (such as quarts glass sheet and colorless glass sheet), ceramic supports, paper supports, and wood supports. They also include synthetic resin supports. Such synthetic resins include polyesters (such as polyethylene naphthalate and polyethylene terephthalate), polyamides, polycarbonates, cellulose esters (such as cellulose acetate), fluoropolymers (such as polyvinylidene fluoride, polytetrafluoroethylene, and polyhexafluoropropylene), polyethers (such as polyoxymethylene), polyacetals, polyolefins (such as polystyrene, polyethylene, polypropylene, and polymethylpentene), and polyimides (such as polyimideamide and polyether imide).

The support 7 of these plastics may be formed rigid or flexible.

If the common electrode 6 is sufficiently rigid, the support 7 may be omitted.

The supports 1 and 7 are held apart with a resin seal 10 attached to their periphery, so that the transparent pixel electrodes 2 oppose to the common electrode 6, as shown in FIG. 4. With their periphery fixed by the resin seal 10, the supports 1 and 7 keep between them the transparent pixel electrodes 2, the TFTs 3, the polymeric electrolyte layer 5, and the common electrode 6.

The display element 18 of this embodiment, which is constructed as mentioned above, is capable of active matrix drive with TFTs 3. This leads to enhanced contrast and color density due to deposition and dissolution of metal ions (electrolyte) contained in the polymeric electrolyte layer 5.

The display element 18 is produced in the following manner. The space between the transparent pixel electrodes 2 and the common electrode 6 is injected with a mixture for the polymeric electrolyte layer 5. This mixture is composed of a starting material (monomer or uncrosslinked polymer) and a coloring substance (metal ions derived from a metal halide compound such as silver halide). Subsequently, the starting material is polymerized or crosslinked by heating or irradiation, so that the polymeric electrolyte layer 5 is formed. Being a low-viscosity solution, the starting material can be readily and invariably formed into a flexible thin film (of any shape) as the polymeric electrolyte layer 5.

In addition, the low-viscosity starting material permits a variety of additives to be uniformly dispersed therein and also gives a polymer (polymeric electrolyte) in uniform thickness.

The coloring substance placed between the transparent pixel electrodes 2 and the common electrode 6 produces color and loses color selectively upon electrochemical reduction and oxidation. Moreover, the function of color development and color bleaching is promoted by ion supply that occurs as the polymeric electrolyte propagates ions. This offers the advantage that the display element does not suffer discoloration despite its prolonged operation with a high contrast and a high color density.

The display element 18 shown in FIGS. 3 and 4 is produced by the process which is explained below with reference to FIGS. 1A to 1C and FIGS. 2A and 2B.

Figure 1A:
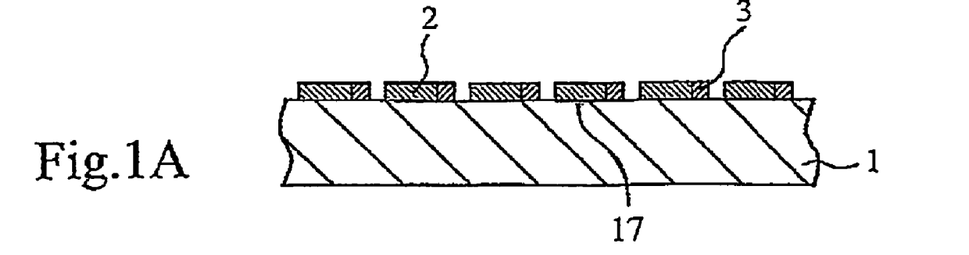
FIGS. 1A to 1C are sectional views showing the process for producing a display element in one embodiment of the present invention.

First, as shown in FIG. 1A, the transparent support 1 (such as glass sheet) is processed so as to form thereon the transparent pixel electrode 2 (ITO film) and the TFT 3 for each pixel 17. The TFT 3 is formed by any known semiconductor technology. The transparent pixel electrodes 2 (ITO film) are formed by sputtering (physical film forming) and photoetching. The transparent pixel electrode 2 and the TFT 3 are formed for each pixel 17. The pixels 17 are arranged in dot pattern or matrix pattern on the transparent support 1.

Figure 1B:
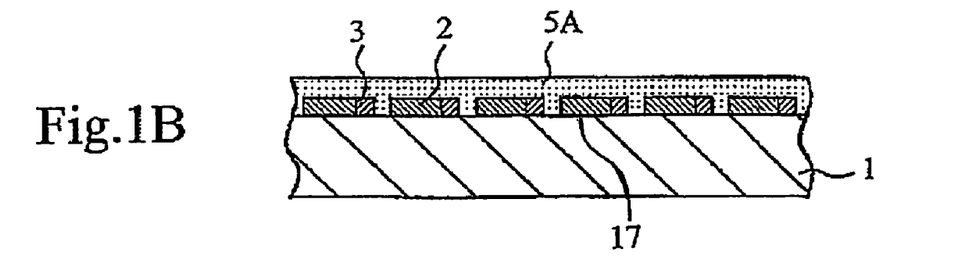

Then, as shown in FIG. 1B, the transparent support 1 is coated with a solution 5A of the starting material (such as monomer) for the polymeric electrolyte layer 5 in a prescribed thickness. The starting material is polymerized by the method mentioned later, so that the polymeric electrolyte layer 5 is formed.

The support 7 of polyethylene terephthalate or the like is coated with palladium film in a prescribed thickness by sputtering or the like to form the common electrode 6.

Figure 1C:
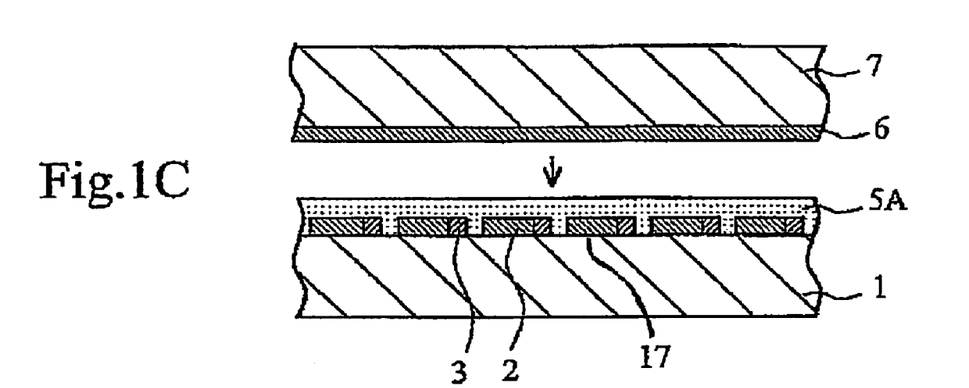

Then, the support 7 is placed on the support 1 in such a way that the common electrode 6 comes into contact with the solution 5A, as shown in FIG. 1C. This step causes the supports 7 and 1 to hold between them the solution 5A, as shown in FIG. 2A.

Figure 2A:
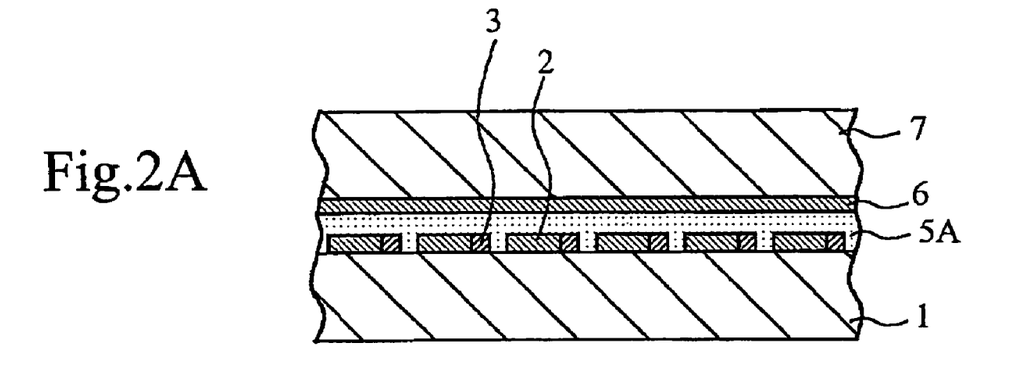
FIGS. 2A and 2B are sectional views showing the process for producing the display element mentioned above.
Figure 2B:
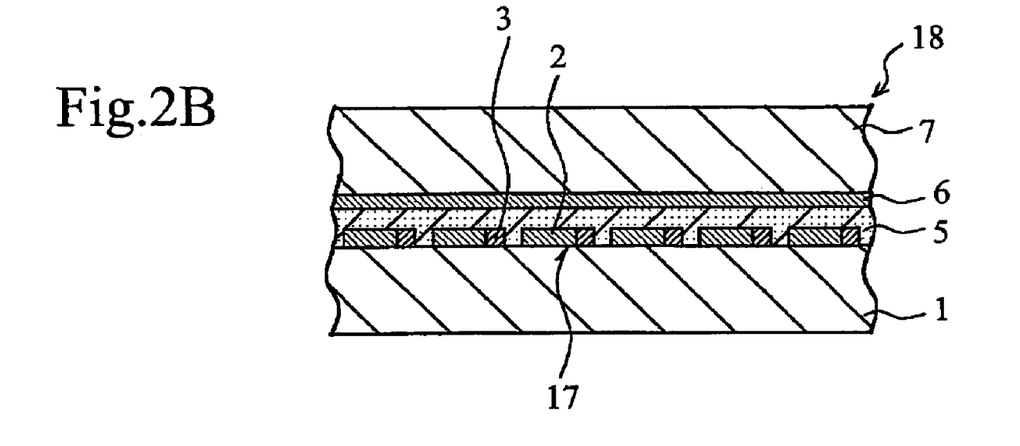

The assembly shown in FIG. 2A is heated (as mentioned later) so that the substance in the solution 5A is polymerized or crosslinked. Thus the polymeric electrolyte layer 5 is formed between the support 7 and the transparent support 1, as shown in FIG. 2B.

A detailed description is given below of the process for forming the polymeric electrolyte layer 5. This process is designed for thermal polymerization, photopolymerization, or radiation polymerization.

[Thermal Polymerization]

Thermal polymerization is suitable for the display element having the polymeric electrolyte layer constructed as shown in FIGS. 3 and 4. This structure is the same as that of the display element in which the polymeric electrolyte layer is formed by photopolymerization or radiation polymerization.

The process for producing the display element involves a step of forming the polymeric electrolyte layer 5 containing silver ions, as shown in FIGS. 1A to 1C and FIGS. 2A and 2B. This step is explained below in more detail.

First, a monomer or a low-molecular-weight linear polymer (which constitutes the basic skeleton of the polymeric electrolyte) is previously dissolved in an adequate aprotic non-aqueous solvent (organic solvent), which is not specifically restricted. The organic solvent may be any general-purpose battery solvent which is exemplified below.

Ethylene carbonate, propylene carbonate, butylene carbonate, dimethyl carbonate, diethyl carbonate, ethyl methyl carbonate, methyl acetate, ethyl acetate, ethyl propionate, dimethylsulfoxide, γ-butyrolactone, dimethoxy ethane, diethoxy ethane, tetrahydrofuran, formamide, dimethyl formamide, diethyl formamide, dimethyl acetamide, acetonitrile, propionitrile, and methylpyrrolidone.

Selection of an adequate solvent from the above-mentioned examples depends on volatility. A highly volatile solvent may be removed by heating or evacuation when or after the starting material is polymerized to produce the display element from a volatile material. Alternatively, the solvent may be partly left in the display element.

The starting material to form the polymeric electrolyte includes polyalkylene oxide (such as polyethylene oxide), polyalkylene imine (such as polyethylene imine), and polyalkylene sulfide (such as polyethylene sulfide), which have the skeleton unit represented by $—[(CH_2)_mO—]_n—$, $—[(CH_2)_mN]_n—$, and $—[(CH_2)_mS—]_n—$, respectively, and branches extending from the main chain. It also includes polymeric materials such as polyacrylate, polymethyl methacrylate, polyvinylidene fluoride, polycarbonate, polyacrylonitrile, polyvinyl alcohol, and mixtures thereof.

In the above-mentioned solvent is dissolved a coloring substance (electrolyte), which is at least one kind of silver salts selected from silver nitride, silver borofluoride, silver halide (such as AgI), silver perchlorate, silver cyanide, and silver thiocyanide.

The silver salt may be used in combination with at least one kind of supporting electrolyte selected from quaternary ammonium halide (halogen=F, Cl, Br, or I), alkali metal halide (such as LiCl, LiBr, LiI, NaCl, NaBr, and NaI), and alkali metal cyanide or thiocyanide, (alkali metal=Na, Li, or K). The supporting electrolyte serves to stabilize the coloring substance.

Additional examples of supporting electrolyte include lithium salts (such as $LiBF_4$, $LiClO_4$, $LiPF_6$, and $LiCF_3SO_3$), potassium salts (such as KCl, KI, and KBr), and tetraalkyl ammonium salts (such as tetraethyl ammonium borofluoride, tetraethyl ammonium perchlorate, tetrabutyl ammonium borofluoride, etrabutyl ammonium perchlorate, and tetrabutyl ammonium halide). The tetraalkyl ammonium salts may have alkyl chains varying in length from one another.

When the polymeric electrolyte layer 5 is formed, the polymeric compound may be incorporated with a prescribed amount of plasticizer to improve its processability. Preferred plasticizers for hydrophilic polymers are water, ethyl alcohol, isopropyl alcohol, and mixtures thereof. Preferred plasticizers for hydrophobic polymers are ethylene carbonate, propylene carbonate, butylene carbonate, dimethyl carbonate, diethyl carbonate, ethyl methyl carbonate, γ-butyrolactone, acetonitrile, propionitrile, sulfolane, dimethoxyethane, diethoxyethane, tetrahydrofuran, methyl acetate, ethyl acetate, ethyl propionate, formamide, dimethylformamide, diethylformamide, dimethylsulfoxide, dimethylacetamide, n-methylpyrrolidone, and mixtures thereof (particularly aprotic solvents).

The polymeric electrolyte layer 5 is incorporated with a coloring agent for improvement in contrast. In the case where metal ions produce a black color, the background is incorporated with a white coloring material having a high hiding power. Examples of the white coloring material include white cloth, white paper, and white particles for coloring. The white particles for coloring may be selected from titanium dioxide, calcium carbonate, silicon dioxide (silica), magnesium oxide, and aluminum oxide. It is also possible to use dyestuff for colorings.

The coloring agent (in the form of inorganic particles) may be used in an amount of 1–50 wt %, preferably 1–10 wt %, more preferably 5–10 wt %.

Inorganic white particles, such as titanium dioxide, should be used in an amount less than 20 wt %, because they merely disperse in the polymeric material without dissolution and they aggregate when used in an excess amount. Aggregation brings about an uneven optical density. In addition, inorganic particles lack ionic conductivity and hence lower the conductivity of the polymeric electrolyte when used in an excess amount.

The dyestuff as a coloring agent should be used in an amount of 10 wt % because it produces a color much more efficiently than inorganic particles. Therefore, any electrochemically stable dyestuff can produce a desired contrast even when it is used in a small amount. Desirable dyestuff is an oil-soluble dye.

In the case where inorganic particles are used as a coloring agent, the polymeric electrolyte layer 5 should have a thickness of 20–200 μm, preferably 50–150 μm, more preferably 70–150 μm.

The thinner the polymeric electrolyte layer 5, the better, because resistance across the electrodes decreases with decreasing thickness. And, lower resistance leads to lower power consumption and rapid color development and color bleaching. However, a layer thinner than 20 μm is poor in mechanical strength and subject to pin-holes and cracking.

In addition, an excessively thin layer does not produce sufficient whiteness (contrast) due to insufficient white particles.

In the above-mentioned steps, a solution is prepared by dissolving in a solvent a coloring substance (metal ions such as silver salt), a supporting electrolyte, and a starting material (or a raw material for the polymeric electrolyte layer), such as a monomer or an uncrosslinked polymer. To this solution is further added an initiator for thermal polymerization. This initiator may be a peroxide (such as benzoyl peroxide) or an azobis compound (such as azobisisobutyronitrile). It may also be any known material. One or more than one initiator may be used.

In the step of producing the display element 18, the transparent support 1 is coated with a solution 5A (containing in a solvent the starting material (raw material), metal ions, supporting electrolyte, polymerization initiator, and coloring agent) which has been adjusted to an optimal viscosity. This coating may be accomplished by wet process such as casting and printing.

In this case, the solution 5A which has been applied to the transparent support 1 becomes flat and keeps a desired thickness due to its surface tension. Therefore, the polymeric electrolyte layer 5 to be formed after polymerization invariably has a predetermined thickness.

Then, as shown in FIGS. 1C and 2A, the support 7 is placed on the solution 5A, so that the raw material solution 5A of polymeric electrolyte is held between the support 7 and the transparent support 1, with the electrodes 6 and 2 being in contact with it.

Figure 7:
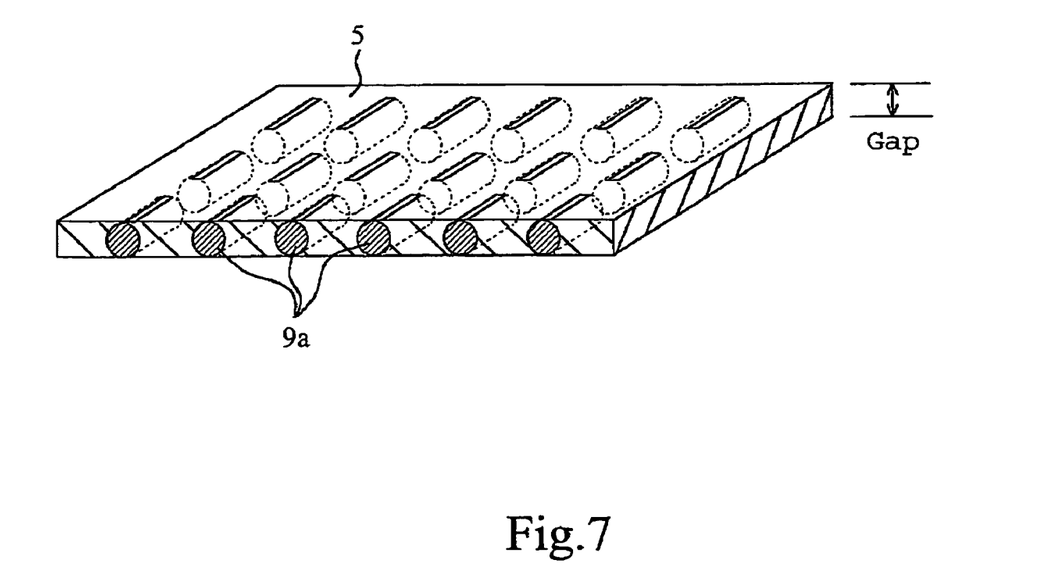
FIG. 7 is a perspective view showing the polymeric electrolyte layer containing spacers.

In this case it is necessary to keep a certain gap between the electrodes which hold the raw material solution 5A of the polymeric electrolyte. This object is achieved by using a spacer as shown in FIG. 7. This spacer is a particulate or rod-like reinforcement 9a of desired size which is previously incorporated into the solution 5A to strengthen the element. (The spacer may also be placed on the support 1.)

Figure 8A:
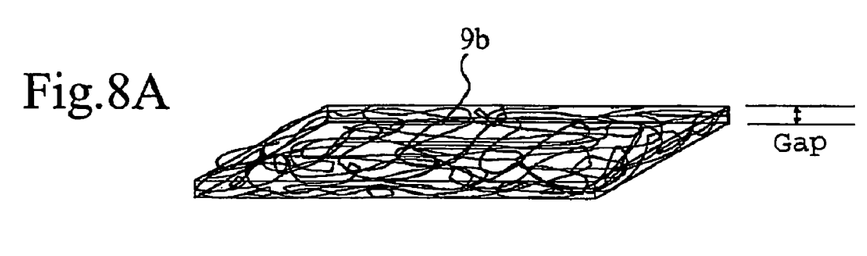
FIG. 8A is a perspective view of the spacer mentioned above.
Figure 8B:
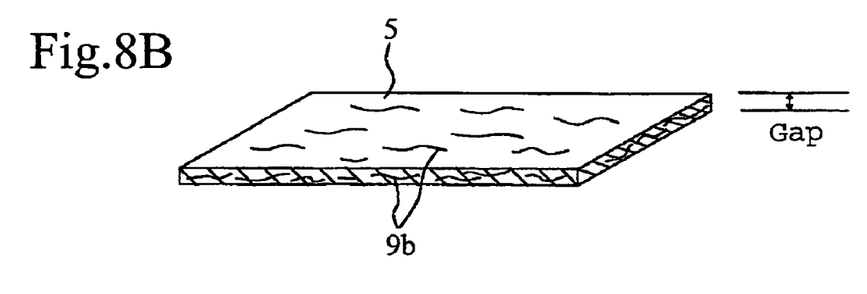
FIG. 8B is a perspective view of the polymeric electrolyte layer containing the spacers mentioned above.

Alternatively, the object of keeping a gap between the electrodes is achieved by using a spacer 9b of non-woven fabric or paper, as shown in FIG. 8A. It is possible to keep an optimal gap between the electrodes by impregnating the spacer 9b of non-woven fabric or paper with the raw material solution of polymeric electrolyte, as shown in FIG. 8B.

After the raw material solution 5A of polymeric electrolyte has been held between the electrodes, the assembly is heated at an adequate temperature (from room temperature to 200° C.) for a few minutes to about five hours, so that the starting material in the solution undergoes thermal polymerization. Thus the solution becomes gelled and forms the polymeric electrolyte layer 5 containing the above-mentioned various substances.

Incidentally, it is desirable to use a crosslinking agent which brings about chemical bonding (crosslinking) among the liner polymeric compounds (as the starting substance mentioned above), thereby forming a polymer compound of three-dimensional network structure. This crosslinking agent may be previously added to the starting material or added at the time of polymerization reaction for the linear polymeric compound.

Examples of the crosslinking agent include divinyl compounds (such as divinyl benzene, 1,5-hexadien-3-ine, hexatriene, divinyl ether, and divinyl sulfone) and diaryl compounds (such as aryl phthalate, 2,6-diacrylphenol, and diarylcarbinol).

The crosslinking agent may be the one which is based on ionic reaction, condensation reaction, or addition reaction. The one based on condensation reaction includes aldehyde, dialdehyde, urea derivative, glycol, dicarboxylic acid, and mono- or diamine. The one based on addition reaction includes diisocyanate, bisepoxy compounds, and bisethyleneimine.

Incidentally, the above-mentioned solution may be incorporated with a prescribed amount of a polymer of above-mentioned monomer, such as polyethylene oxide, so that the solution has an adequate viscosity.

The display element in this embodiment (which has the polymeric electrolyte layer 5 capable of thermal polymerization) is prepared in the following manner. The space between the transparent electrodes 2 and the common electrode 6 is filled with the solution 5A which contains a liner polymer (or a monomer thereof) of polymeric electrolyte such as polyethylene oxide and a coloring substance such as AgI. Then, the linear polymer undergoes crosslinking and thermal polymerization, so that the polymeric electrolyte layer 5 is formed. The advantage of this procedure is that the starting material (before polymerization) has a low viscosity and hence it can be formed into any desired shape. Thus, the polymeric electrolyte layer in the form of thin film can be readily obtained without variation.

In addition, the low-viscosity starting material permits easy and uniform dispersion of various substances therein. This makes it possible to form the polymer (polymeric electrolyte) in a uniform thickness.

The display element produces a desired display pattern when an electric field is applied across the first and second electrodes. This electric field causes the coloring substance (silver salt) to undergo electrochemical reduction (deposit of silver), thereby producing a color selectively, or to undergo electrochemical oxidation (dissolution of silver), thereby bleaching a color. The polymeric electrolyte promotes the reduction and oxidation reactions and transports ions, so that color development and color bleaching take place rapidly. In addition, it keeps a high contrast and a high color density, and it produces a long-lasting color in prolonged use.

The display element in this embodiment can be applied to a paper-like display medium, such as electronic paper. Since the raw material solution 5A for the polymeric electrolyte is highly fluid, it can be readily formed into a thin film. Thus, the polymeric electrolyte layer 5 may be a thin, flexible, durable thin film that can be used for a high-quality fixable paper-like thin display medium.

Even when the electric power across the two electrodes is turned off, the coloring substance A, which has separated out, remains for a certain period of time, as shown in FIG. 4. In other words, it has the memory effect. Therefore, the display element can be used as a recording medium as electronic paper having a good contrast which will supercede printed matter.

[Photopolymerization]

In this case, photopolymerization is used to polymerize the above-mentioned starting substance. Photopolymerization is accomplished by irradiating the raw material solution with ultraviolet rays (5–200 mW, less than 5000 J/cm$^2$) for a few minutes to about 30 minutes. Ultraviolet rays may be replaced by radiation; polymerization in this case is radiation polymerization. Other procedures are the same as those mentioned above.

Photopolymerization employs at least one initiator selected from the group consisting of benzophenone, thiophenol, and other derivatives having a benzoin group, anthraquinone group, or phenylacetophenone group.

In this embodiment, too, the display element (which has the polymeric electrolyte layer 5 capable of phtopolymerization) is prepared in the following manner. The space between the transparent electrodes 2 and the common electrode 6 is filled with a solution which contains a starting material of polymeric electrolyte such as polyethylene oxide and a coloring substance such as AgI. Then, the starting material undergoes photopolymerization, so that the polymeric electrolyte layer 5 is formed. The advantage of this procedure is that the starting material gives the polymeric electrolyte layer in the form of uniform thin film easily without variation.

The display element performs selective color development and color bleaching as the coloring substance undergoes electrochemical reduction and oxidation between the first and second electrodes. It keeps a high contrast and a high color density, and it produces a long-lasting color in prolonged use.

Figure 6:
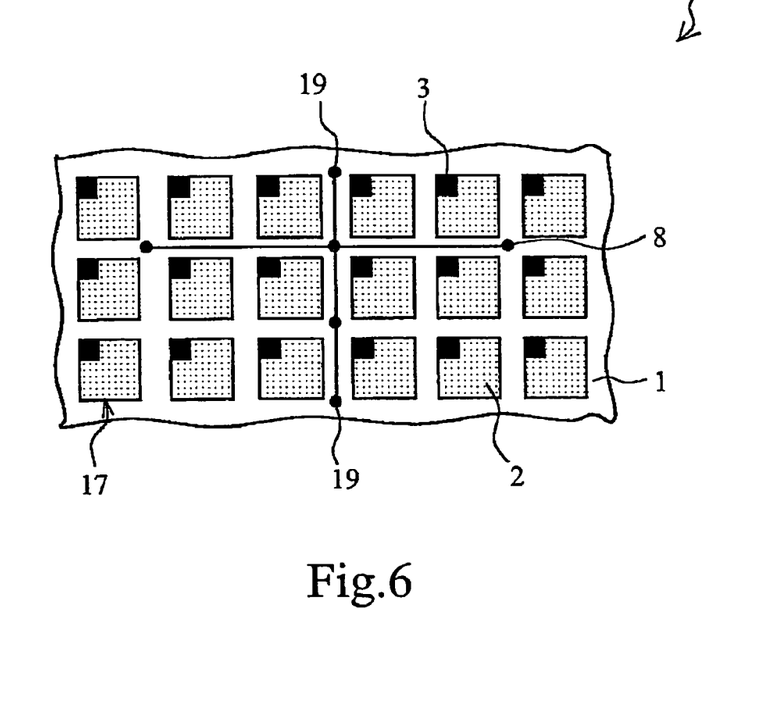
FIG. 6 is a partial plan view seen from the transparent pixel electrode of the display element mentioned above.

The display element 18 in this embodiment may be provided with a potential detective electrode (as a third electrode) as shown in FIG. 6. This element is independent of the transparent pixel electrode 2 and the common electrode 6. It is on the transparent support 1 and in the same plane as the transparent pixel electrodes 2 or the common electrode 6. It is an electrically insulated member which detects the potential of the transparent pixel electrodes 2 (on the transparent support 1) or the common electrode 6.

FIG. 6 shows that the transparent support 1 has the TFTs 3 as the driving devices formed thereon which drive the transparent pixel electrodes 2 for individual pixels 17, and also has the potential detecting electrode 8 formed thereon which takes on a cross-like pattern. The potential detecting electrode 8 is terminated with silver or aluminum electrodes (about 1000 nm thick) 19 indicated by black circles. The two terminal electrodes (19, 19) are connected by a silver or aluminum wire (about 1 µm wide).

This potential detecting electrode 8 is a member which is electrically isolated in the same plane as the transparent pixel electrodes 2. Therefore, it can accurately monitor the potential of the transparent pixel electrode 2 and hence it can detect the reaction that takes place on the transparent pixel electrode 2.

The potential detecting electrode 8 should preferably be formed from a stable metallic material which does not take part in reactions and does not dissolve in the solvent. For example, it may be formed from platinum, chromium, aluminum, cobalt, palladium, or silver, as in the case of the second electrode 6.

FIG. 5 is an equivalent circuit diagram representing the display apparatus 20 based on the display element 18 having the potential detecting electrode 8. The display element 18 consists of pixels 17 arranged in a matrix form. Each pixel 17 has the TFT (thin film transistor) 3, the transparent pixel electrode 2, and the common electrode 6. The display element also has the data line drive circuit 12a and 12b and the gate line drive circuit 13 to select individual pixels 17. The data lines 14 and the gate lines 15 are selected by the drive circuits 12a, 12b, and 13 under control by the signal control unit 16.

The signal control unit 16 is connected to the potential detecting electrode 8, so that the potential of pixel detected by the potential detecting electrode 8 can be monitored. Monitoring with the potential detecting electrode 8 causes the control unit 16 to issue control signals to suspend further reaction (voltage application across the electrodes) when electrochemical reaction has proceed sufficiently.

The following deals with the examples of the present invention.

EXAMPLE 1

First, the transparent pixel electrodes were formed as follows. A glass substrate 1 (measuring 1.5 mm thick, 10 cm square) was fabricated to form thereon the ITO film 2 and the thin film transistor (TFT) 3 in the usual way. Individual sets of ITO film 2 and TFT 3 are arranged at intervals of 150 µm. The glass substrate 1 was provided with leads connected to the drive circuit in the usual way.

A uniform raw material solution was prepared by dissolving in dimethylsulfoxide 50 mM of AgI (metal ions (electrolyte) as a coloring substance) and 100 mM of NaI (as a supporting electrolyte). The solution was further incorporated with 1 wt % of uncrosslinked polyethylene oxide having a weight-average molecular weight of 400,000. The resulting solution was given 0.2 parts by weight of titanium dioxide (as a coloring agent) having an average particle diameter of 0.5 µm. The coloring agent was uniformly dispersed by using a homogenizer.

The solution was examined for the state of polymerization by heating with stirring. It was found that the solution began to coagulate at 20° C., with webbing at 40° C. to 60° C., and began to increase in viscosity at 80° C.

The viscosity at 80° C. increased from 180 mpa·s to 780 mPa·s, measured by a rotating viscometer of cone-disc type (made by Toki Sangyo Co., Ltd.). This viscometer has a cone with a tip angle (φ) of 1°34' and a disc with a radius (R) of 24 mm, it was rotated at 5 rpm for 60 seconds.

The viscosity increase is an indication of thermal polymerization. Upon thermal polymerization, there was obtained a polyethylene oxide film containing silver ions capable of electrodeposition.

To be more specific, the glass substrate provided with ITO film was coated to a prescribed thickness by casting with the above-mentioned solution. On the cast solution was placed the support 7 of polyethylene terephthalate film, measuring 0.5 mm thick and 10 cm square, which has a palladium film (3000 Å thick) as the common electrode formed thereon by sputtering. The assembly was heated at 80° C. or above for several minutes, so that the polyethylene oxide in the solution was crosslinked.

The resulting display cell (in which the polymeric electrolyte layer 5 has been formed by thermal polymerization) was tested for response characteristics in the following manner. The results are shown in FIG. 9.

Figure 9:
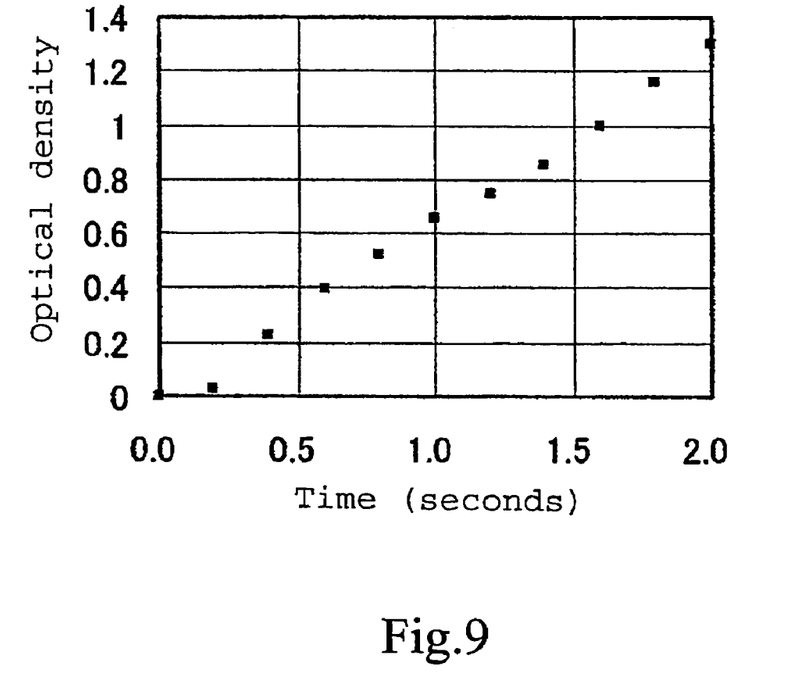
FIG. 9 is a graph showing how the optical density of the display cell changes with time in one embodiment of the present invention.

The measurement data shown in FIG. 9 is obtained under a condition with the drive at a constant current of 10 mA/cm$^2$. In FIG. 9, the optical density due to reflected light from the cell is plotted against time required for the cell to produce the optical density. The optical density represents the amount of metal ions which has been electrolytically deposited. The value of optical density is expressed in terms of $-\log(I/I_0)$ on a log scale (where "I" denotes the density of transmitted light and "$I_0$" denotes the intensity of incident light)

An optical density 1 represents a situation in which the transmittance is 10% and the reflectance is 90%. An optical density 0 represents a situation in which the transmittance is 100% and the reflectance is 0%. It is noted from FIG. 9 that the display cell takes only about 1.6 seconds for the optical density to reach 1 (or the reflectance to reach 90%). Moreover, the change with time in optical density is relatively linear. This implies good response characteristics.

EXAMPLE 2

This example differs from Example 1 in that the raw material solution for the polymeric electrolyte was incorporated with 1 wt % of ethoxyphenylphenylacetophenone as a photosensitizer which works as an initiator for photopolymerization. Photopolymerization was accomplished by irradiation with ultraviolet rays (from an 8-mW low-pressure mercury lamp) for 300 seconds.

The display cell, in which the polymeric electrolyte layer was formed according to this example, was tested for response characteristics in the same way as in Example 1. The results are shown in FIG. 10.

Figure 10:
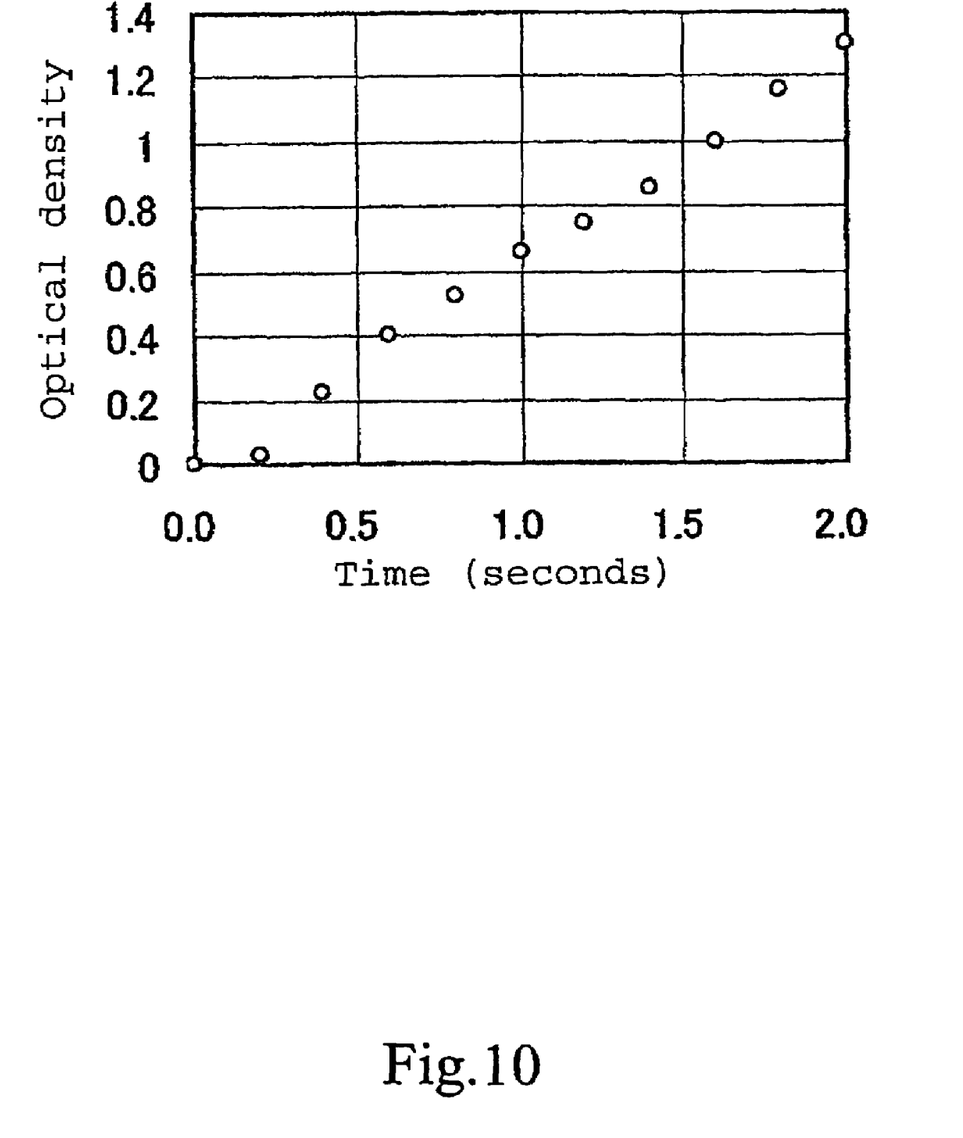
FIG. 10 is a graph showing how the optical density of the display cell changes with time in another embodiment of the present invention.

It is noted from FIG. 10 that the display cell takes only about 1.6 seconds for the optical density to reach 1 (or the reflectance to reach 90%). Moreover, the change with time in optical density is relatively linear. This implies good response characteristics.

The above-mentioned embodiments and examples may be variously modified within the scope of the present invention.

For example, the matrix drive may be not only active matrix drive (with TFTs) but also passive matrix drive (without TFTs).

Also, the electrode may take on not only a dot-like pattern but also a stripe-like pattern.

As mentioned above, the display element according to the present invention is characterized in that the polymeric electrolyte layer is formed between the first and second electrodes from a starting material (a monomer or an uncrosslinked polymer) containing a coloring substance, by polymerization or crosslinking. The starting material before polymerization or crosslinking is a low-viscosity fluid that can be formed into any desired shape. Therefore, the polymeric electrolyte layer in the form of thin flexible film can be obtained easily without variation.

In addition, the low-viscosity starting material permits uniform dispersion of various additives. This makes it easy to form the polymeric electrolyte in uniform thickness.

In addition, the polymeric electrolyte promotes the color development and color bleaching which are selectively carried out by electrochemical reduction and oxidation of the coloring substance placed between the first and second electrodes. Thus, the display element has a high contrast and a high color density and operates for a long period of time without discoloration.

The invention claimed is:

1. A display element which comprises a coloring substance, which separates out, dissolves, or changes in color upon electrochemical reduction or oxidation, and a polymeric electrolyte, which are both held between a first electrode and a second electrode, said polymeric electrolyte being formed from an uncrosslinked polymer as a starting material by polymerization or crosslinking between said first and second electrodes,
   wherein the second electrode comprises carbon supported on a metal electrode, and
   wherein the metal electrode is selected from the group consisting of platinum, chromium, aluminum, cobalt, and palladium.

2. The display element as defined in claim 1, wherein said polymeric electrolyte is formed from a mixture of said polymeric electrolyte incorporated with said coloring substance.

3. The display element as defined in claim 1, wherein said coloring substance contains ions capable of electrodeposition derived from at least one member selected from the group consisting of bismuth, copper, silver, lithium, iron, chromium, nickel, and cadmium.

4. The display element as defined in claim 1, wherein said starting substance is polymerized by any one method selected from the group consisting of thermal polymerization, photopolymerization, and radiation polymerization.

5. The display element as defined in claim 4, wherein said thermal polymerization employs an initiator for thermal polymerization, such as peroxide compound and azobis compound, and said photopolymerization employs an initiator for photopolymerization.

6. The display element as defined in claim 1, wherein said starting substance is at least one member selected from the group consisting of polyalkylene oxide (such as polyethylene oxide), polyalkylene imine (such as polyethylene imine), and polyalkylene sulfide (such as polyethylene sulfide), which have the skeleton unit represented by—$[(CH_2)_mO]_n$—, —$[(CH_2)_mN]_n$—, and —$[(CH_2)_mS]_n$—, respectively, and branches extending from the main chain, polyacrylate, polymethyl methacrylate, polyvinylidene fluoride, polycarbonate, polyaciylonitrile, polyvinyl alcohol, and mixtures thereof.

7. The display element as defined in claim 1, wherein said polymeric electrolyte is incorporated with a plasticizer.

8. The display element as defined in claim 1, wherein said polymeric electrolyte contains at least one whitening auxiliary material selected from the group consisting of white particles, white cloth, and white paper.

9. A process for producing a display element having a first electrode and a second electrode, a coloring substance, which separates out, dissolves, or changes in color upon electrochemical reduction or oxidation, and a polymeric electrolyte, which are both held between the first electrode and the second electrode, said process comprising placing an uncrosslinked polymer (as a starting material) together with said coloring substance between said first and second electrodes and polymerizing or crosslinking said starting material, thereby forming said polymeric electrolyte,
   wherein the second electrode is formed by printing with a resin-based carbon paint on a metal electrode.

10. The process for producing a display element as defined in claim 9, wherein said polymeric electrolyte is formed from a mixture of said polymeric electrolyte incorporated with said coloring substance.

11. The process for producing a display element as defined in claim 9, wherein the coloring substance is incorporated with ions capable of electrodeposition derived from at least one member selected from the group consisting of bismuth, copper, silver, lithium, iron, chromium, nickel, and cadmium.

12. The process for producing a display element as defined in claim 9, wherein said starting substance is polymerized by any one method selected from the group consisting of thermal polymerization, photopolymerization, and radiation polymerization.

13. The process for producing a display element as defined in claim 12, wherein said thermal polymerization employs an initiator for thermal polymerization, such as peroxide compound and azobis compound, and said photopolymerization employs an initiator for photopolymerization.

14. The process for producing a display element as defined in claim 9, wherein said starting substance is at least one member selected from the group consisting of polyalkylene oxide (such as polyethylene oxide), polyalkylene imine (such as polyethylene imine), and polyalkylene sulfide (such as polyethylene sulfide), which have the skeleton unit represented by —$[(CH_2)_mO]_n$—, —$[(CH_2)_mN]_n$—, and —$[(CH_2)_mS]_n$—, respectively, and branches extending from the main chain, polyacrylate, polymethyl methacrylate, polyvinylidene fluoride, polycarbonate, polyacrylonitrile, polyvinyl alcohol, and mixtures thereof.

15. The process for producing a display element as defined in claim 9, wherein the polymeric electrolyte is incorporated with a plasticizer.

16. The process for producing a display element as defined in claim 9, wherein said polymeric electrolyte is incorporated with at least one whitening auxiliary material selected from the group consisting of white particles, white cloth, and white paper.

* * * * *